United States Patent
Cuthbert

[11] 3,806,925
[45] Apr. 23, 1974

[54] COUNTERMEASURES SYSTEM

[75] Inventor: William W. Cuthbert, Oxnard, Calif.

[73] Assignee: The United States of America as represented by the Secretary of the Navy, Washington, D.C.

[22] Filed: Jan. 26, 1961

[21] Appl. No.: 85,168

[52] U.S. Cl................ 343/18 E, 325/132, 325/158
[51] Int. Cl........................... G01s 9/02, H04k 3/00
[58] Field of Search.......... 250/17.1, 17.12; 343/18, 343/18 E; 325/156, 158, 132, 49; 179/15 ST

[56] References Cited
UNITED STATES PATENTS

| | | | |
|---|---|---|---|
| 2,852,678 | 9/1958 | Crapuchettes | 352/132 |
| 2,459,485 | 1/1949 | Bartlett | 179/15 ST |
| 1,805,918 | 5/1931 | Meissner | 250/17 |
| 2,018,356 | 10/1955 | Hammond | 250/17 |
| 2,640,193 | 5/1953 | Carter et al | 250/17 |
| 2,688,074 | 8/1954 | Goldstine | 250/17 |

Primary Examiner—Malcolm F. Hubler
Attorney, Agent, or Firm—Richard S. Sciascia; J. M. St. Amand

EXEMPLARY CLAIM

1. In an electronic countermeasures system, the combination of an enemy radar designed to aquire or maintain a "lock-on" condition with respect to a target, such radar being designed to receive energy extending over a relatively wide portion of the radar spectrum and to amplify such received energy at a preselected unvarying intermediate frequency, and countermeasures apparatus for preventing said enemy radar from acquiring or maintaining such a "lock-on" condition with respect to said target, said countermeasures apparatus comprising a first microwave oscillator operating at a constant frequency, a second microwave oscillator operating at a different constant frequency, the respective operating frequencies of the two said oscillators being such that the difference therebetween is approximately equal to the intermediate frequency of the enemy radar to be disabled, means for combining the respective outputs of said oscillators to retain the individual identities of the respective oscillator outputs, and means for transmitting the energy so combined so that the two output frequencies remain separated by an amount equal to the intermediate frequency of the enemy radar.

4 Claims, 3 Drawing Figures

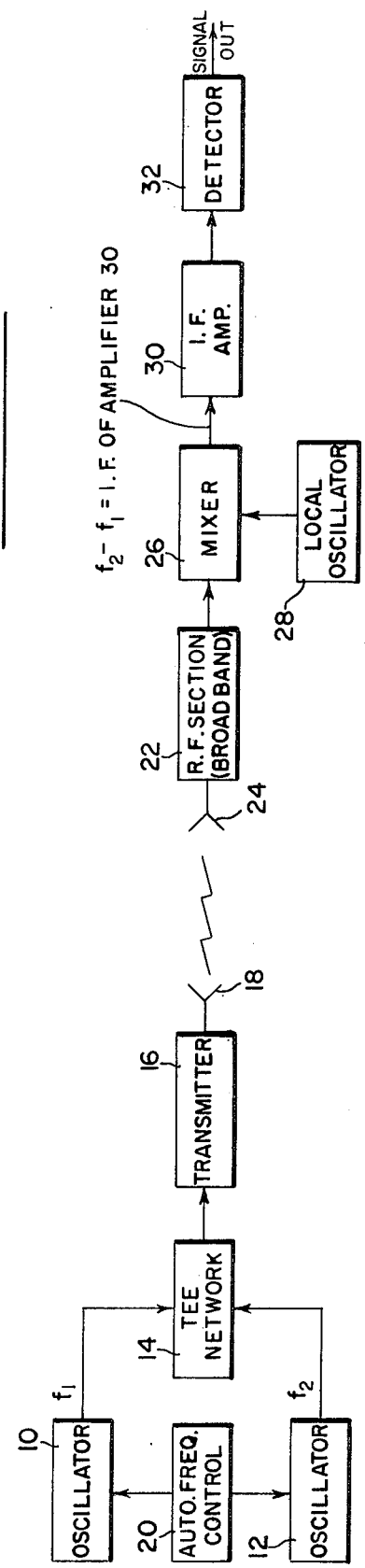
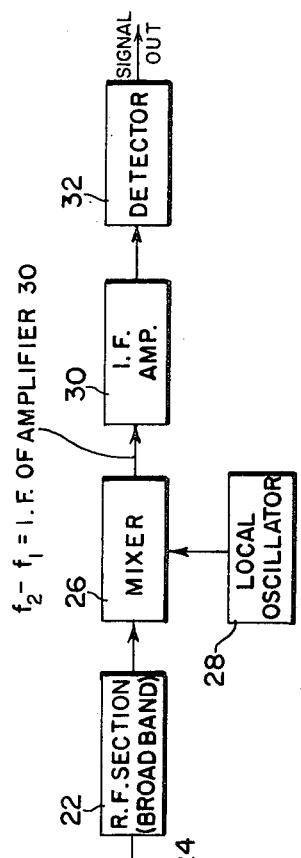
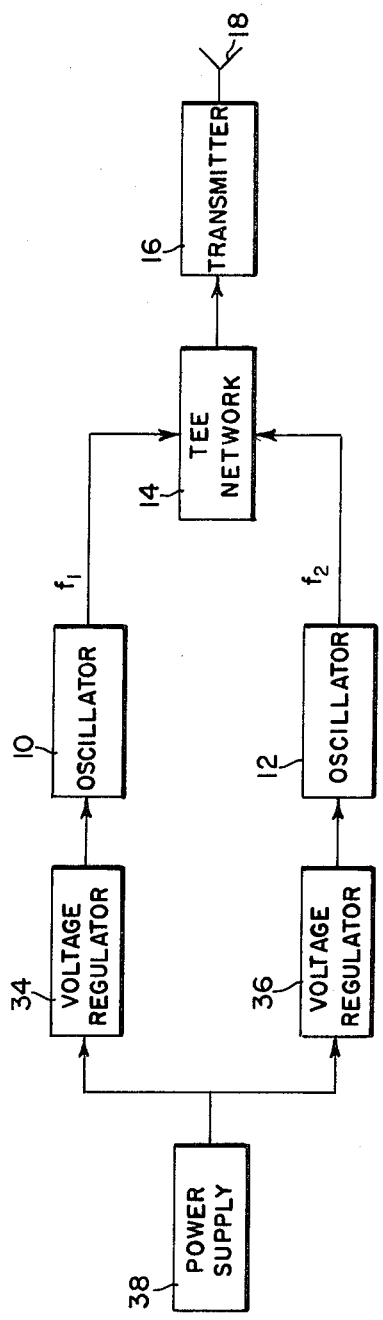

COUNTERMEASURES SYSTEM

The invention described herein may be manufactured and used by or for the Government of the United States of America for governmental purposes without the payment of any royalties thereon or therefor.

The present invention relates to a method and means for effectively disabling an enemy radar so as to prevent it from acquiring a target, or, if the target had previously been acquired, to prevent it from maintaining a "lock-on" condition with respect thereto.

It has become standard practice to employ radar apparatus to indicate the presence, or determine the location, of targets or other objects under wartime conditions. In some instances, ground-based radars are used to warn of the approach of airborne vehicles such as enemy aircraft, while in other applications radar equipment is designed as an integral part of certain missiles so as to permit them to locate a moving target and then "home-in" on the latter despite any evasive action that the target may carry out in an attempt to avoid impact.

The widespread use of such radar systems has stimulated activity in the field of countermeasures. This activity has been directed largely to means for effectively disabling the radar equipment so as to preclude the latter (whether ground-based or airborne) from locking on to a particular target, or, alternatively, from maintaining such a condition once it has been established. This procedure, known as "jamming," is performed by electronic means, and heretofore has consisted of generating energy in a high-powered high-duty-cycle transmitter having a frequency as nearly identical as possible to the operating frequency of the radar to be rendered ineffective. When received by the radar, this energy mixes with the local oscillator output to yield a high-duty-cycle signal at the I-F amplifier. The result is usually a saturation of the second detector, or, in certain instances, the development of a large negative voltage by the receiver AGC circuit to materially reduce the over-all receiver gain to a point where the target reflections are of too low an amplitude to be observed or to perform any control function.

A countermeasures system of the above type has several disadvantages. Primarily, since it requires a jamming transmitter adjusted quite closely to the frequency of the radar to be jammed, the radiating source is quite readily detectable by the radar operators, permitting them to quickly initiate counter-countermeasures. Furthermore, the jamming transmitter must be tunable to the R-F frequency of the radar, and, in addition, must develop large amounts of jamming energy which in turn requires a power source of large capacity. Frequently, the complexity, space and/or weight considerations of such equipment precludes its use, especially in airborne environments.

While it would be highly desirable to simplify such ECM (electronic countermeasures) systems, any such efforts at simplification must take into account the fact that radar apparatus of the pulse type is particularly vulnerable to jamming energy having a high duty cycle. Energy of this nature develops bias potentials (for example) beyond the linear operating capabilities of such receiver circuits as the I-F amplifier, detector and video amplifier to cause severe distortion and/or reduction of signal gain. It may be assumed, however, that the radar apparatus is designed for broad-band operation and hence incorporates very little R-F preselection. It may be further assumed that the intermediate frequency of the radar apparatus is standard and hence known to the operator of the jamming transmitter.

On the basis of the assumptions thus made, it has been found that a radar may be effectively jammed by transmitting the jamming energy on a frequency determined not by the R-F, or operating, frequency of the radar, but instead on two frequencies separated by the radar's I-F frequency. One very important advantage to be achieved by such an expedient is that the radar operators will be unable to identify the source of the jamming signals, and will therefore be unable to initiate any effective counter action. In a majority of cases, the radar operators will not even recognize the fact that jamming is taking place, but will merely be denied target information without knowing the reason therefor.

One preferred apparatus comprising such an electronic jamming system includes a pair of microwave oscillators each of which operates on a different constant frequency. An AFC (automatic frequency control) network is employed to maintain the frequency separation (but not the individual frequencies) of these two oscillators constant, the amount of such frequency separation being chosen to correspond to the intermediate frequency of the radar apparatus to be rendered ineffective. The individual frequencies of the two oscillators are not important, and can lie in any conventional portion of the radar frequency spectrum. It is only the difference therebetween that is made use of to achieve the objectives of the present invention.

A further advantage obtained from the use of a countermeasures system designed in accordance with the present concept is that effective jamming of an enemy radar is brought about when any one of the following three conditions exists:

1. The difference in frequency between the two jamming signals is equal to the I-F amplifier frequency of the enemy radar.
2. The frequency of either jamming signal coincides with the frequency of the radar target or local oscillator signals.
3. The frequency of either jamming signal is displaced from the radar or local oscillator frequency by the I-F amplifier frequency. While the probability of conditions 2 and 3 being met by a random selection of two microwave signals, separated in frequency by a receiver I-F frequency, is remote, the possibility does exist and becomes a plus-factor when considering the concept as a whole. Obviously, however, condition 1 is of primary importance, and the invention will be set forth as though this factor alone were determinative.

One object of the present invention, therefore, is to provide an improved method and means for disabling, or materially reducing the effectiveness of, enemy radar apparatus to prevent the latter from "locking-on" a target, or, if the target had previously been acquired, from maintaining such a "lock-on" condition.

Another object of the invention is to provide a jamming system including a pair of microwave oscillators each operating at a different constant frequency, and further means for maintaining the frequency separation therebetween at a value corresponding essentially to the I-F frequency of the radar to be jammed.

A further object of the invention is to reduce the complexity and power requirements of electronic countermeasures equipment.

Other objects and many of the attendant advantages of this invention will be readily appreciated as the same become better understood by reference to the following detailed description when considered in connection with the accompanying drawings wherein:

FIG. 1 is a schematic illustration of a jamming transmitter designed in accordance with a preferred embodiment of the present invention;

FIG. 2 is a schematic illustration of a typical radar receiver of a nature designed to be rendered ineffective by operation of a jamming transmitter such as illustrated in FIG. 1; and FIG. 3 is a schematic illustration of a modified jamming transmitter utilizing the basic principles of the apparatus of FIG. 1.

Referring first to FIG. 1 of the drawings, there is shown one form of transmitting apparatus in which the principles of the present invention have been embodied. This apparatus includes a first microwave oscillator which may be of any conventional nature and which is designated by the reference numeral 10. One particularly suitable form of oscillator comprises a velocity-modulation tube, such as a klystron, arranged to generate an output of constant frequency $f_1$. Purely as an example, $f_1$ may represent a continuous wave output of 9800 megacycles.

Also shown in FIG. 1 is a second oscillator 12, which may be similar in design to oscillator 10, and which operates to generate a continuous wave output of a constant frequency $f_2$. Again as an example, the operating frequency of oscillator 12 may be chosen to be 9830 megacycles. The outputs of oscillators 10 and 12 are combined in a standard tee network 14, and then fed to a transmitter 16 for radiation from an antenna 18.

To maintain the separation frequency of oscillators 10 and 12 constant, an automatic frequency control unit 20 is utilized as shown in the drawing. Inasmuch as the unit 20 may be of any known design, it has been set forth in schematic fashion, and it merely serves to ensure that the difference between the frequencies passing through tee 14 does not vary to any significant degree from a figure of 30 megacycles (in the example given).

The jamming transmitter illustrated in FIG. 1 has as its primary purpose the disabling of an enemy radar apparatus so that the latter will be unable to acquire (or maintain the acquisition of) a specified target. One form of radar receiver which can thus be acted upon by the energy transmitted from the apparatus of FIG. 1 is illustrated in the drawing as FIG. 2. This radar receiver of FIG. 2 is of a type widely used for the purpose of detecting airborne objects, and, in the usual fashion, includes an R-F section 22 through which a signal received by antenna 24 passes, this signal then being applied to a conventional mixer 26 together with signals from a local oscillator 28. The resulting signal then passes through an I-F amplifier 30, following which it is detected at 32 to yield the positional data or other information contained therein.

As is standard practice in radar receivers of the type illustrated in FIG. 2, the R-F section 22 (whether consisting of a single stage or a plurality of stages) is purposely designed to receive energy over a wide frequency band. In other words, such R-F components are not sharply tuned, but instead have an intentionally broad frequency characteristic.

It has been mentioned above that a large majority of radar receivers are designed to have a standard I-F frequency. In other words, it can be assumed that the I-F amplifier circuit 30 of FIG. 2 is arranged to pass therethrough signals having a given intermediate frequency of, say, 30 megacycles for the example given. The receiver itself, however, may have its R-F section 22 designed so that the basic radar operating frequency is 9375 megacycles, such as in the case of the AN/APQ-51 radar.

Assuming such a value of 30 megacycles for the radar I-F amplifier 30, it will now be appreciated that the respective operating frequencies $f_1$ and $f_2$ of the oscillators 10 and 12 of FIG. 1 are each chosen so that the difference frequency therebetween is maintained at this 30 megacycle figure by the automatic frequency control unit 20. Expressed differently, $f_2$ is chosen to be equal to $f_1$ plus the I-F frequency of the radar receiver of FIG. 2.

The operation of the system of FIG. 1 is such that the jamming signals radiated from antenna 18 cause the radar receiver of FIG. 2 to be rendered ineffective insofar as target information is concerned by creating an excessive bias (in the case of the AN/APQ-51 radar) at the detector 32. This detector 32, which is customarily designed for low-duty-cycle signals, is quickly saturated by the high-amplitude jamming signals radiated from antenna 18, and is consequently unable to pass any target information as long as the jamming signals are being received. Furthermore, since the signal in the radar range gate determines the AGC voltage of the system, the radar amplifiers operate at maximum gain and thereby greatly increase the difference-frequency signal amplitude. Once this jamming signal saturates the detector 32, no further increase in jamming signal strength is required no matter how large the target signal may be.

The above conditions prevail prior to the time a target has been acquired by the radar or, in other words, the "prevent-lock" status. However, if a target signal appears in the receiver range gate prior to reception by the radar of a jamming signal, a different situation exists, and this target signal in the radar range gate causes a reduction in receiver gain so that moderately increased jamming signal energy is required to effectively disable the radar.

The above discussion of one manner in which the countermeasures system of FIG. 1 is effective in connection with a radar receiver such as the AN/APQ-51 is not directly applicable to receiving equipment of the type utilized, for example, in a Doppler radar receiver. In the latter case, incoming jamming signals reduce receiver gain by saturating the AGC network. This reduction in gain prevents the receiver from either acquiring or maintaining lock-on with respect to any particular target. It is a characteristic of such a receiver that, in order to keep its gain at a minimum value, an increase in amplitude of the target signal requires a corresponding increase in jamming signal power.

FIG. 3 illustrates a modification of the transmitting apparatus of FIG. 1. Instead of employing a pair of oscillators 10 and 12 of a type which are capable of stabilization by the automatic frequency control unit 20, it is instead feasible to substitute for these oscillators alternative devices (such, for example, as Carcinotrons)

which are designed to be voltage responsive. In this case the automatic frequency control unit 20 of FIG. 1 may be dispensed with, and a pair of voltage regulator units 34 and 36 respectively connected to the oscillators 10 and 12. As shown in the drawing, these voltage-regulator units 34 and 36 are energized from a common power supply 38, with the respective outputs of the regulators 34 and 36 being such as to maintain the operating frequencies of the oscillators 10 and 12 separated by an amount equal to the I-F frequency of the radar receiver of FIG. 2 in the same manner that has been described above in connection with FIG. 1. In neither case are the individual frequencies of the oscillators 10 and 12 significant, and only the difference therebetween is of consequence insofar as effective operation of the disclosed system is concerned.

Obviously many modifications and variations of the present invention are possible in the light of the above teachings. It is therefore to be understood that within the scope of the appended claims the invention may be practiced otherwise than as specifically described.

I claim:

1. In an electronic countermeasures system, the combination of an enemy radar designed to acquire or maintain a "lock-on" condition with respect to a target, such radar being designed to receive energy extending over a relatively wide portion of the radar spectrum and to amplify such received energy at a preselected unvarying intermediate frequency, and countermeasures apparatus for preventing said enemy radar from acquiring or maintaining such a "lock-on" condition with respect to said target, said countermeasures apparatus comprising a first microwave oscillator operating at a constant frequency, a second microwave oscillator operating at a different constant frequency, the respective operating frequencies of the two said oscillators being such that the difference therebetween is approximately equal to the intermediate frequency of the enemy radar to be disabled, means for combining the respective outputs of said oscillators to retain the individual identities of the respective oscillator outputs, and means for transmitting the energy so combined so that the two output frequencies remain separated by an amount equal to the intermediate frequency of the enemy radar.

2. An electronic countermeasures system in accordance with claim 1, further comprising an AFC network connected to both said oscillators for maintaining constant the separation frequency between the respective outputs thereof.

3. An electronic countermeasures system in accordance to claim 1, in which each of said oscillators includes a voltage-tunable tube, further comprising means for regulating the voltage applied to the tube of each oscillator to control the output frequency thereof.

4. A method of effectively disabling an enemy radar apparatus to prevent the latter from establishing a "lock-on" condition with respect to a target, such apparatus being designed to receive energy extending over a relatively wide portion of the radar spectrum and to amplify such received energy at a preselected unvarying intermediate frequency, said method including the steps of generating energy at a first constant frequency, generating further energy at a second constant frequency, the said second frequency being separated from the said first frequency by an amount approximately equal to the intermediate frequency of the radar apparatus to be disabled, and then transmitting the energy so generated.

* * * * *